Feb. 6, 1923.
1,443,969
W. H. THIEMER.
UNIVERSAL JOINT.
FILED APR. 4, 1919.
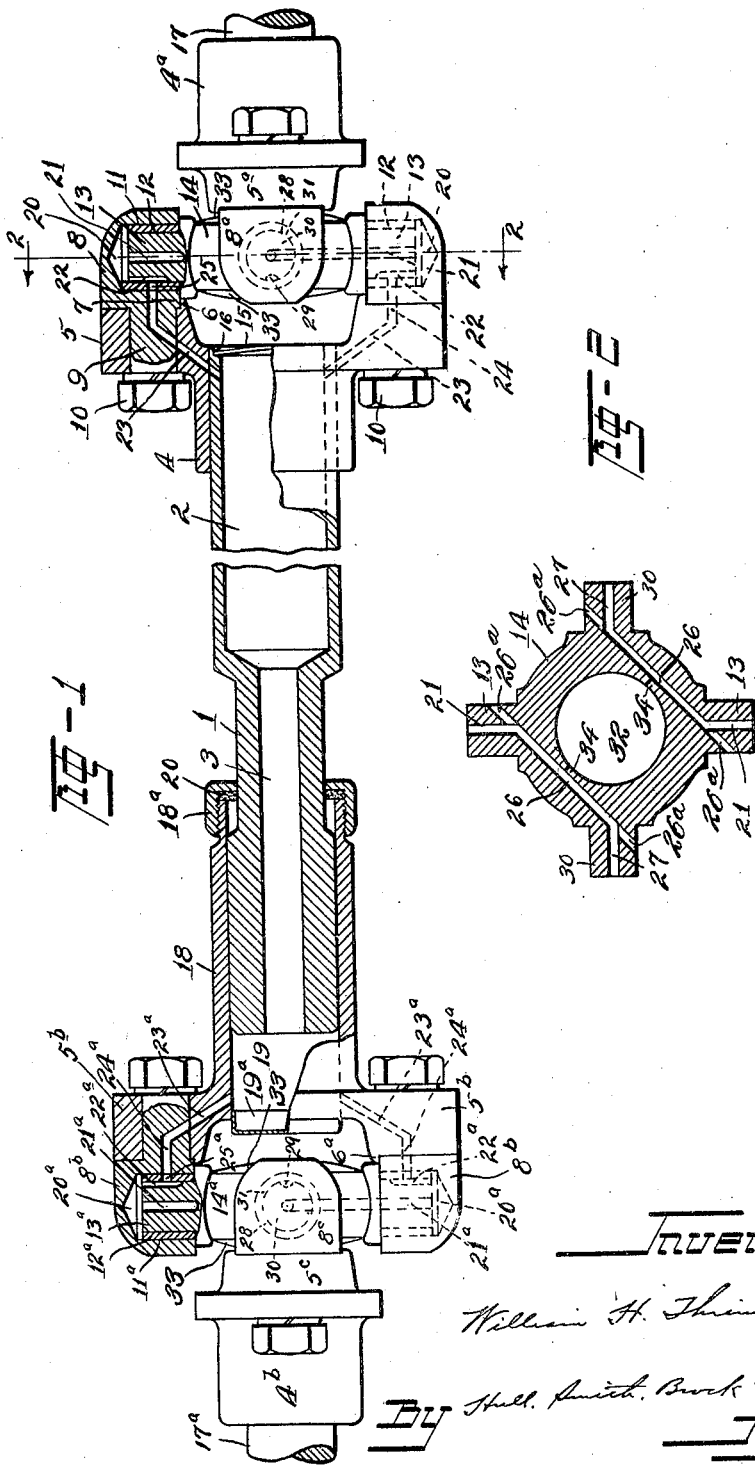

Patented Feb. 6, 1923.

1,443,969

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

Application filed April 4, 1919. Serial No. 287,556.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and the general object of the same is to provide such joints with efficient means for lubricating the journals or bearings thereof. More limitedly, the invention consists of the cooperating construction and arrangement of the parts whereby this lubrication is effected, as will be pointed out in the specification and covered by the combinations of elements embodied in the claims.

In the drawings forming part hereof and illustrating a means for accomplishing the objects of my invention, Fig. 1 represents a view, partly in elevation and partly in section, of a pair of universal joints and the shaft sections connected thereby and Fig. 2 a sectional view through the intermediate or cross member of one of such joints, the view corresponding to the line 2—2 of Fig. 1.

Describing by reference characters the various parts illustrated herein, 1 denotes a shaft section, said section being provided at one end thereof with a chamber 2 for heavy oil or similar lubricant. From the opposite end of the chamber 2 the shaft there extends a bore 3 by means of which the lubricant may be conducted to a universal joint located at the end of the shaft section opposite said chamber. To the chambered end of the shaft section there is secured a hub 4 having base flanges 5, which flanges may be of the general type shown, described and claimed in the patent of Frederick W. Peters No. 1,304,901, issued May 27, 1919, each of the base flanges being provided at each side of the central portion thereof with a transverse rib or shoulder 6 adapted to engage the cooperating face 7 of a bearing block, said bearing block being provided with a stem 9 projecting through a bore in the base flange and having on its end a nut 10 by means of which the block may be drawn to its seat upon the said flange, the arrangement permitting the convenient application of the blocks to the flange as well as their convenient removal therefrom and preventing the rotation of said bearing blocks upon said flange. Each of the bearing blocks is provided with a bore 11 extending outwardly from the inner face thereof for the reception of a bushing 12, the bushings supporting the opposite trunnions 13 of a cross member, indicated generally at 14. The end of the chamber 2 is closed by a plate 15 which may be of the "Welch plug" type, being sprung under pressure into its seat 16. The other trunnions of the cross member 14 are journaled in similar bearing blocks $8^a$ mounted on the base flanges $5^a$ of a hub $4^a$ secured to the end of a shaft section 17.

The end of the shaft section 1 which is opposite the chamber 2 is shown as having thereon an elongated hub 18 and secured in place by means of a shouldered or gland nut $18^a$ threaded upon one end thereof, there being packing $18^b$ interposed between the shoulder of said nut and the adjacent end of the hub.

The opposite end of the hub projects beyond the shaft section 1, providing a chamber 19 which is closed at its outer end by means of a plate or plug $19^a$. The hub 18 is provided with a base flange $5^b$ substantially identical with the flange 5 and having shoulders $6^a$ for the bearing blocks $8^b$, the said blocks being substantially identical with the blocks 8 and having the bores $11^a$ and the bushings $12^a$ receiving the trunnions $13^a$ of the cross member $14^a$. The other trunnions of the cross member are mounted in bearing blocks $8^c$ similar to the blocks $8^b$ and secured in like manner to the base flange $5^c$ of a hub $4^b$ on a third shaft section indicated at $17^a$.

The bore of each bearing block is extended beyond the bushing and the trunnion therein to provide a lubricant well 20, $20^a$, and each trunnion is provided with an axial port 21, $21^a$, extending inwardly from said well. Each trunnion is also provided with a port formed by a groove or channel 22, $22^a$ extending from its outer end to a point where it communicates with a passageway conducting lubricant thereto from the wells provided at opposite ends of the shaft section 1. Lubricant is conducted from either end of the hollow shaft section to the ports 22, $22^a$, by means of a pair of inclined ports 23, 23ᵃ leading through the base flanges 5 and 5ᵇ and through one side of and as far as the center of the studs 9 and 9ᵃ of the pair of bearing blocks mounted on such base flange. At their outer or delivery ends, the ports 23, 23ᵃ communicate each with an axial port 24, 24ᵃ, respectively, extending to the bore of each of the four bearing blocks 8, 8ᵇ, through a port 25, 25ᵃ in the bushing for each of the trunnions 13, 13ᵃ and communicating with the ports 22, 22ᵃ. By this construction and arrangement of parts, lubricant from the large well or chamber 2 will be delivered to the wells 20 and 20ᵃ, formed within the bearing blocks 8 and 8ᵇ. From these wells lubricant will be conducted inwardly through the ports 21 and 21ᵃ, through inclined ports 26 in each cross member, through axial ports 27 in each of the other pair of trunnions of each cross member, to the wells provided in the outer ends of the bearing blocks 8ᵃ and 8ᶜ, as indicated in dotted lines at 28, said wells being similar to the wells 20 and 20ᵃ. From these wells, the lubricant will be distributed to the bearings by means of ports 29 (shown in dotted lines), similar to the ports 22, 22ᵃ and communicating with the spaces between the exterior of the trunnions 30 and the interior surface of the bushings 31. It will be understood that the arrangement of the bores, lubricant wells and bushings within the bearing blocks 8ᵃ and 8ᶜ will be substantially identical with the arrangement shown in detail for the blocks 8 and 8ᵇ.

By this construction and arrangement of the parts, lubricant from the hollow shaft section 1 will be delivered from wells at opposite ends thereof through ports formed within the bushings for one pair of trunnions of the cross member to the wells formed within the bearing blocks and thence through axial ports in the said trunnions and in the other trunnions of each cross member to wells in the bearing blocks for such other trunnions and thence to ports provided in the outer surface of each of the last mentioned trunnions to the bearings formed between the exterior surfaces of the last mentioned trunnions and the interior surfaces of their bushings. This construction and arrangement provides not only an efficient means for lubricating the trunnion bearings, but a lubricant chamber of such capacity communicating therewith as will enable the joints to be used for a long time without the necessity for refilling the chamber. The arrangement is such that lubricant will be supplied from each chamber by centrifugal action to the bearings notwithstanding the fact that the supply of lubricant within the hollow shaft section and the chambers thereof may be materially diminished through use.

The centrifugal action will cause the lubricant to fill the wells 20 and 20ᵃ and the wells provided in the bearing blocks 8ᵃ and 8ᶜ, the pressure of the lubricant in the said wells being transmitted to the parts 22, 22ᵃ and 29, thus insuring the efficient lubrication of the bearings for the trunnions.

The ports 26 are commercially formed by drilling completely through the cross member. The ends are purposely left unclosed so that lubricant may be supplied through the extensions 26ᵃ thereof to the interior of the surrounding bushings, thereby providing each trunnion with two lubricating ports communicating with the bushings therefor.

The ports 26 also communicate with a central well 32 formed within the ring of the cross member by cover plates 33, short ports 34 being provided for this purpose. These wells provide in effect expansion chambers to accommodate the pumping action produced by the oscillations of the shaft section 1 and also ensure an efficient centrifugal distribution of lubricant through the ports 26 to the bearings.

The sliding connection between the hub 18 and end of the shaft section 1 causes an automatic pumping action from the shaft section to the bearings as the said shaft section oscillates, as through the movements of an automobile to which it may be attached.

Having thus described my invention, what I claim is: —

1. In a universal joint, the combination of a shaft section having a lubricant well and a supporting base, bearings carried by said base, a second shaft section having a base and bearings carried thereby, a cross member having trunnions journaled in said bearings, passageways for conducting lubricant from said well to the bearings, of its base, and passageways in said cross member extending from the last mentioned bearings to the other bearings.

2. In a universal joint, the combination of a shaft section having a lubricant well and a supporting base, a pair of bearings on said base, each of said bearings being provided with a well therebeyond, a second shaft section having a supporting base and a pair of bearings, each having a well therebeyond, the first mentioned base having a pair of passageways therein each communicating with one of the first mentioned wells and with the bearing therefor, a cross member having trunnions mounted in said bearings, means serving to conduct lubricant from the wells of the first two bearings to the wells provided in the second pair of bearings, and means in each of the second pair of bearings for conducting lubricant from the well thereof to its bearing.

3. In a universal joint, the combination of a shaft section having a lubricant well and a supporting base, bearings carried by said base and each having a well therebeyond, a bushing in each bearing, a second shaft section having a supporting base and bearings, each of the last mentioned bearings having a well therebeyond and a bushing therewithin, a cross member journaled in said bushings, passageways communicating with the first mentioned well and adapted to conduct lubricant therefrom to the wells provided in the first pair of bearings, and passageways communicating with the wells of the first two bearings and located within the cross member and conducting lubricant from such wells to the wells provided in the second pair of bearings.

4. In a universal joint, the combination of a shaft section having a lubricant well and a supporting base, a pair of bearing blocks each having a stud mounted within said base and provided with a bore closed at its outer end, a bushing in each of said bores and terminating short of the outer end thereof to provide a well beyond each bushing, a second shaft section having a base and bearing blocks thereon each having a bore closed at its outer end and a bushing within each bore and terminating short of the outer end thereof, a cross member having trunnions mounted in said bushings, a port in the stud of each of the first two bearing blocks, a port through each of the bushings in the first two bearing blocks and each constituting an extension of one of the first mentioned ports, a port in each of the trunnions in the first two bushings and communicating each with its bushing port and with the well provided at the outer end of the bore of its bearing block, passageways in the first mentioned base communicating with the first mentioned well and with the first mentioned ports, respectively, and a pair of passageways in said cross member communicating with the wells of the first mentioned bearing blocks for conducting lubricant therefrom to the wells in the second pair of bearing blocks.

5. In a universal joint, the combination of a shaft section having a well for lubricant, a supporting base on said shaft section, a pair of bearing blocks each having a stud mounted in said base and a bearing having a bushing therein and a lubricant well beyond such bushing, a second shaft section having a supporting base and a pair of bearing blocks each having a bearing, a bushing therein, and a well beyond such bushing, a cross member having trunnions journaled in said bushings, a pair of ports extending from the first mentioned well into said studs, ports extending from the delivery ends of the first mentioned ports through the bushings in the first mentioned bearings, a port in the exterior surface of each of the trunnions mounted in the first mentioned bearing blocks and each communicating with one of the last mentioned ports and with the lubricant well provided in its block, a port in each of said trunnions extending from its well, a pair of ports in said cross member for conducting lubricant from the inner end of each of the last mentioned ports, a central or radial port in each of the second pair of trunnions and with which the delivery ends of the last mentioned ports communicate, and a port formed in the exterior surface of each of the last mentioned trunnions for conducting lubricant to the space between the same and its surrounding bushing.

6. In a universal joint, the combination of a shaft section, a hub thereon having a supporting base provided with a pair of bearings, the said shaft section having a well for lubricant, a second shaft section having a hub and a pair of bearings thereon, a connecting member having trunnions journaled in said bearings, ports or passageways extending from said well to the first pair of bearings, and ports or passageways extending from the first pair of bearings to the second pair of bearings, the last mentioned ports or passageways extending through the sides of the trunnions connected thereby.

7. In a universal joint, the combination of a shaft section, a hub on said section provided with a supporting base and bearings thereon, a second shaft section having a hub and a base thereon provided with bearings, a connecting member having trunnions journaled in said bearings, one of said shaft sections being provided with a lubricant well, ports or passageways extending from said well to the bearings carried by its hub, each bearing being provided with a well beyond its trunnion and each of the trunnions within the last mentioned bearings having an external port or passageway communicating with one of the first mentioned ports or passageways and with the well provided in its bearing and each of the last mentioned trunnions having also a port therewithin, ports or passageways in said connecting member extending from the last mentioned ports to ports provided within the other trunnions and to the bearings therefor, the ports or passageways connecting the ports within the trunnions being extended through said trunnions thereby to supply lubricant to the bearings therefor.

8. A connecting member for universal joints comprising a ring having a central lubricant well and provided with opposed pairs of trunnions projecting therefrom, each trunnion being provided with a port extending longitudinally thereof, the port in each of one pair of said trunnions communicating through a port or passageway in said ring with a port in one of the trunnions constituting the other pair, there being a port connecting the ports or passageways in said ring with the said well.

9. A connecting member for universal joints comprising a ring having opposed pairs of trunnions projecting therefrom, said ring having a central lubricant well, each trunnion being provided with an axial port, the inner end whereof communicates through a port or passageway in said ring with the inner end of an axial port in one of the trunnions constituting the other pair, there being a port connecting each of the ports in said ring with the said well, the ports or passageways which connect the axial ports of the trunnions being extended across such axial ports and through the body of each trunnion.

In testimony whereof, I hereunto affix my signature.

WILLIAM H. THIEMER.